United States Patent [19]

Cheng

[11] Patent Number: 5,528,410
[45] Date of Patent: Jun. 18, 1996

[54] SCANNER BASE FOR OPTICAL SCANNERS

[75] Inventor: John Cheng, Hsien, Taiwan

[73] Assignee: Silitek Corporation, Taipei, Taiwan

[21] Appl. No.: 492,498

[22] Filed: Jun. 20, 1995

[51] Int. Cl.⁶ ................................................. G02B 26/08
[52] U.S. Cl. ........................... 359/198; 198/788; 198/791; 271/8.1; 358/296
[58] Field of Search ..................... 359/196–198; 358/296, 498; 271/8.1, 109; 198/790–781, 788, 791

[56] References Cited

U.S. PATENT DOCUMENTS 5,316,130  5/1994  Heit et al. ........................... 198/781
5,422,732  6/1995  Takayanagi ........................... 358/296

Primary Examiner—James Phan
Attorney, Agent, or Firm—Browdy and Neimark

[57] ABSTRACT

A scanner base for an optical scanner, including two end plates, a contact image sensor connected between the end plates, a roller mounted between holes on the end plates and disposed in contact with the contact image sensor, and a motor drive mounted on one end plate and controlled to turn the roller, causing the roller to carry the document to be scanned over the contact image sensor for scanning.

3 Claims, 4 Drawing Sheets

SCANNER BASE FOR OPTICAL SCANNERS

BACKGROUND OF THE INVENTION

The present invention relates to optical scanners, and relates more particularly to the scanner base of an optical scanner which is compact and easy to maintain.

A variety of optical scanners have been developed for use with office automation equipment. These optical scanners are functional, however they are commonly comprised of a big number of parts. Therefore, regular optical scanners are commonly expensive to manufacture and difficult to maintain.

SUMMARY OF THE INVENTION

The present invention has been accomplished to provide a scanner base for optical scanners which eliminates the aforesaid drawbacks. It is therefore an object of the present invention to provide a scanner base for optical scanners which is compact. It is another object of the present invention to provide a scanner base for optical scanners which is inexpensive to manufacture. It is still another object of the present invention to provide a scanner base for optical scanners which is easy to maintain. According to one embodiment of the present invention, the scanner base comprises two end plates, a contact image sensor connected between the end plates, a roller mounted between holes on the end plates and disposed in contact with the contact image sensor, and a motor drive mounted on one end plate and controlled to turn the roller, causing the roller to carry the document to be scanned over the contact image sensor for scanning.

DETAILED DESCRIPTION OF THE PREFERRED EMBODIMENT

Figure 1:
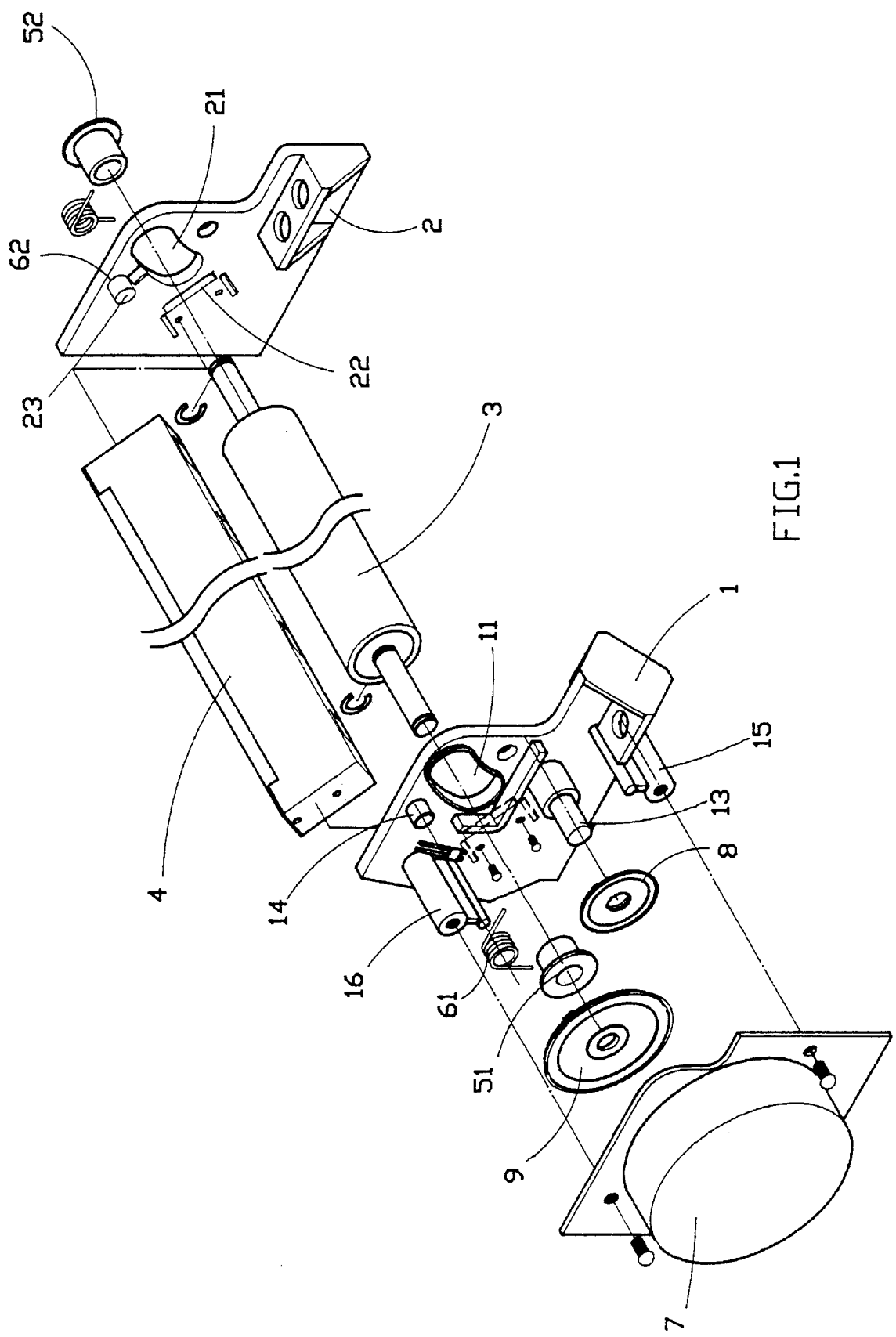
FIG. 1 is an exploded view of a scanner base for optical scanners according to the present invention.
Figure 2:
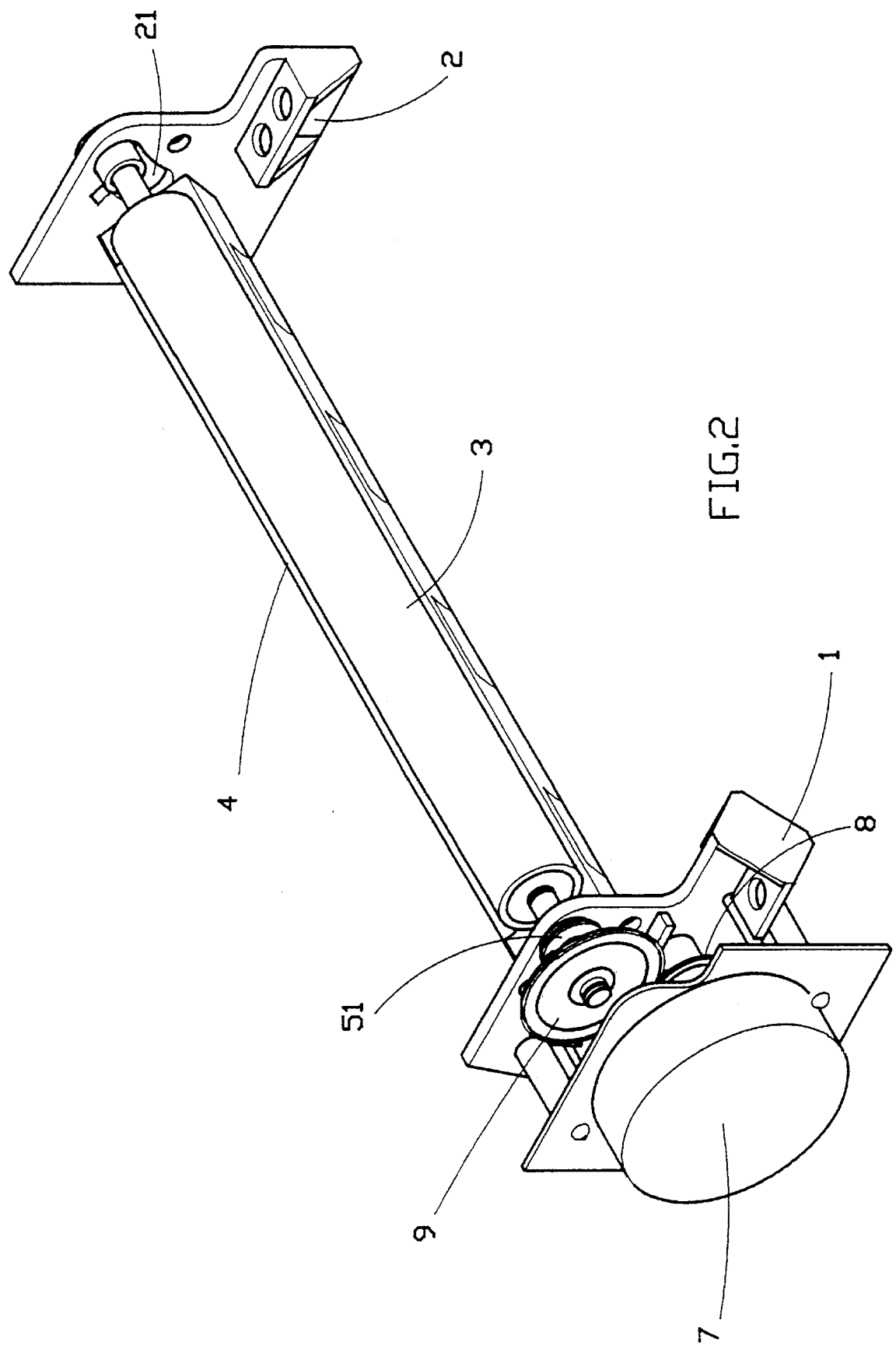
FIG. 2 is an elevational view of the scanner base shown in FIG. 1.
Figure 3:
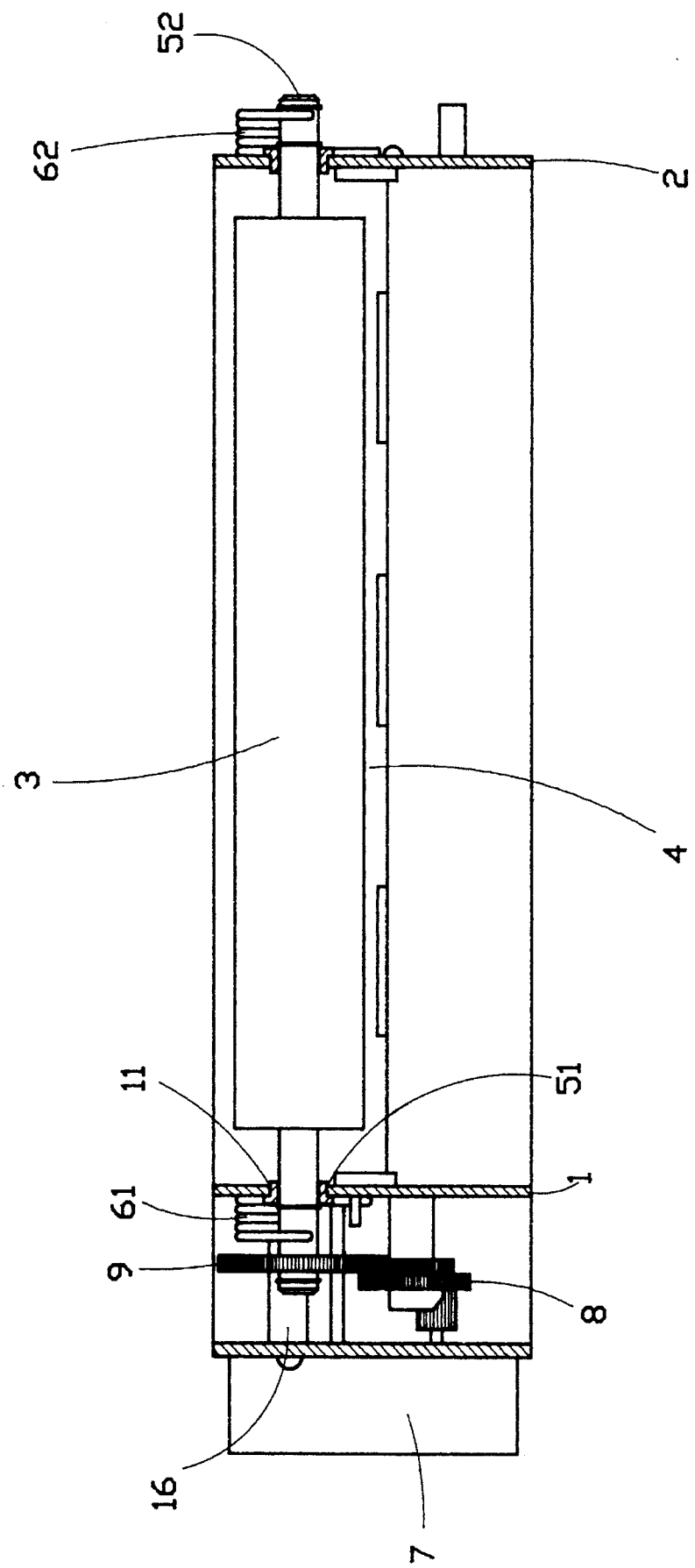
FIG. 3 is a front view in section of FIG. 2.

Referring to FIGS. 1, 2, and 3, a scanner base for an optical scanner in accordance with the present invention comprises:

a first end plate 1 having a sliding slot 11, an upright mounting flange 12, an upright shaft 13, a locating post 14, and two upright female screws 15 and 16;

a second end plate 2 having a sliding slot 21, a mounting flange 22, and a locating post 23;

a roller 3 connected between the sliding slot 11 on the first end plate 1 and the sliding slot 21 on the second end plate 2 and turned on its own axis;

a contact image sensor 4 connected between the upright mounting flange 12 of the first end plate 1 and the upright mounting flange 22 of the second end plate 2 in parallel to the roller 3;

a first bushing 51 mounted within the sliding slot 11 on the first end plate and coupled to one end of the roller 3;

a second bushing 52 mounted within the sliding slot 21 on the second end plate and coupled to an opposite end of the roller 3;

a first torsional spring 61 mounted around the locating post 14 on the first end plate 1, having one end fastened to the first end plate 1 and an opposite end fastened to the first bushing 51 to hold the roller 3 in place;

a second torsional spring 62 mounted around the locating post 23 on the second end plate 2, having one end fastened to the second end plate 2 and an opposite end fastened to the second bushing 52 to hold the roller 3 in place;

a step motor 7 fixedly mounted on the upright female screws 15 and 16 of the first end plate 1, having an output shaft fixedly mounted with a pinion 71;

a stepped transmission gear 8 mounted around the stepped shaft 13 of the first end plate 1 and turned by the pinion 71; and a drive gear 9 coupled to the first bushing 51 and driven by the stepped transmission gear 8 to turn the roller 3.

The roller 3 is preferably covered with a rubber cover so that the can positively carry the document over the contact image sensor 4 when it is turned by the step motor 7 through the pinion 71, the stepped transmission gear 8 and the drive gear 9.

Figure 4:
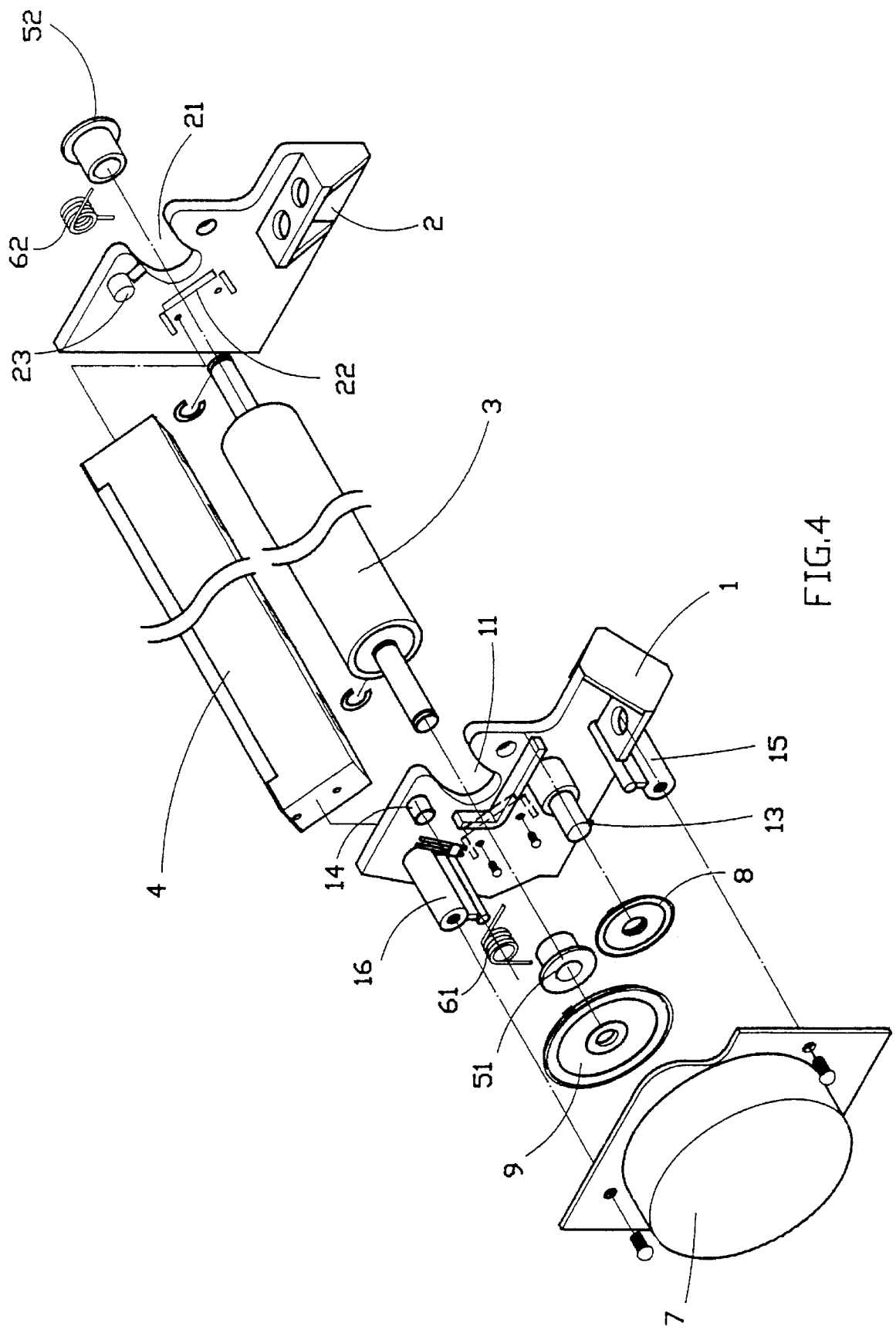
FIG. 4 is an exploded view of an alternate form of the present invention.

FIG. 4 shows an alternate form of the present invention, in which the sliding slots 11 and 21 are open slots. This design permits the roller 3 to be conveniently loaded in the sliding slots 11 and 21. Therefore, the roller 3 can be connected to the top cover of the optical scanner by a link so that the roller 3 is moved away from the sliding slots 11 and 21 when the top cover of the optical scanner is opened.

It is to be understood that the drawings are designed for the purposes of illustration only, and are not intended as a definition of the limits and scope of the invention disclosed.

I claim:

1. A scanner base for an optical scanner, comprising:

a first end plate having a sliding slot, an upright mounting flange, an upright shaft, a locating post, and two upright female screws;

a second end plate having a sliding slot, a mounting flange, and a locating post;

a roller connected between the sliding slot on said first end plate and the sliding slot on said second end plate and turned on its own axis;

a contact image sensor connected between the upright mounting flange of said first end plate and the upright mounting flange of said second end plate and disposed in parallel to said roller to pick up the image of a document passing through the gap between said contact image sensor and said roller;

a first bushing mounted within the sliding slot on said first end plate and coupled to one end of said roller;

a second bushing mounted within the sliding slot on said second end plate and coupled to one end of said roller opposite to said first bushing;

a first torsional spring mounted around the locating post on said first end plate, having one end fastened to said first end plate and an opposite end fastened to said first bushing to hold said roller in place;

a second torsional spring mounted around the locating post on said second end plate, having one end fastened to said second end plate and an opposite end fastened to said second bushing to hold said roller in place;

a step motor fixedly mounted on the upright female screws of said first end plate, having an output shaft fixedly mounted with a pinion;

a stepped transmission gear mounted around the stepped shaft of said first end plate and turned by said step motor through said pinion; and a drive gear coupled to said first bushing and driven by said stepped transmission gear to turn said roller.

2. The scanner base of claim 1 wherein the sliding slots of said first end plate and said second sliding slot are of open slots, each sliding slot having one end extended to the border of the respective end plate.

3. The scanner base of claim 1 wherein said roller is covered with a flexible covering disposed in contact with said contact image sensor.

* * * * *